United States Patent
Sawchuk

(10) Patent No.: US 6,272,329 B1
(45) Date of Patent: Aug. 7, 2001

(54) BIDIRECTIONAL FREQUENCY TRANSLATOR AND FULL DUPLEX TRANSCEIVER SYSTEM EMPLOYING SAME

(75) Inventor: Donald Ernest Sawchuk, Winnipeg (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/207,254

(22) Filed: Dec. 9, 1998

(51) Int. Cl.[7] .................................................. H04B 1/26
(52) U.S. Cl. .............................. 455/326; 455/76; 455/84; 455/86
(58) Field of Search ............................ 455/84, 326, 208, 455/86, 76, 552

(56) References Cited

U.S. PATENT DOCUMENTS

| 4,105,949 | 8/1978 | Hardin ................................... 331/37 |
| 4,554,678 | 11/1985 | Bowman .............................. 455/286 |
| 4,644,526 | 2/1987 | Wu ........................................ 370/30 |
| 5,006,811 | 4/1991 | Kruger ................................ 329/354 |
| 5,423,076 | 6/1995 | Westergren et al. ................... 455/86 |
| 5,590,413 | 12/1996 | Kondratiev et al. .................. 455/86 |
| 5,790,587 | * | 8/1998 | Smith et al. ........................... 375/200 |
| 6,075,996 | * | 6/2000 | Srinivas ................................. 455/552 |
| 6,185,434 | * | 2/2001 | Hagstrom et al. .................... 455/552 |

FOREIGN PATENT DOCUMENTS

| 653851 A2 | * | 5/1995 | (EP) ...................................... 455/326 |
| 69939 A | * | 4/1982 | (JP) ...................................... 455/326 |

* cited by examiner

Primary Examiner—Curtis Kuntz
Assistant Examiner—Barry W Taylor

(57) ABSTRACT

This invention relates to a bidirectional frequency translator apparatus and method in which transmit and receive spectra are simultaneously produced at both a low frequency port and a high frequency port of a mixer. The method involves receiving a first transmit signal at a low frequency port of a first mixer and up-converting the first transmit signal with the mixer to produce an up-converted first transmit signal at a high frequency port of the mixer. Simultaneously a receive signal is received at the high frequency port and is down-converted at the mixer to produce a down-converted receive signal at the low frequency port. The receive signal is injected at the high frequency port while extracting the up-converted first transmit signal from the high frequency port.

22 Claims, 2 Drawing Sheets

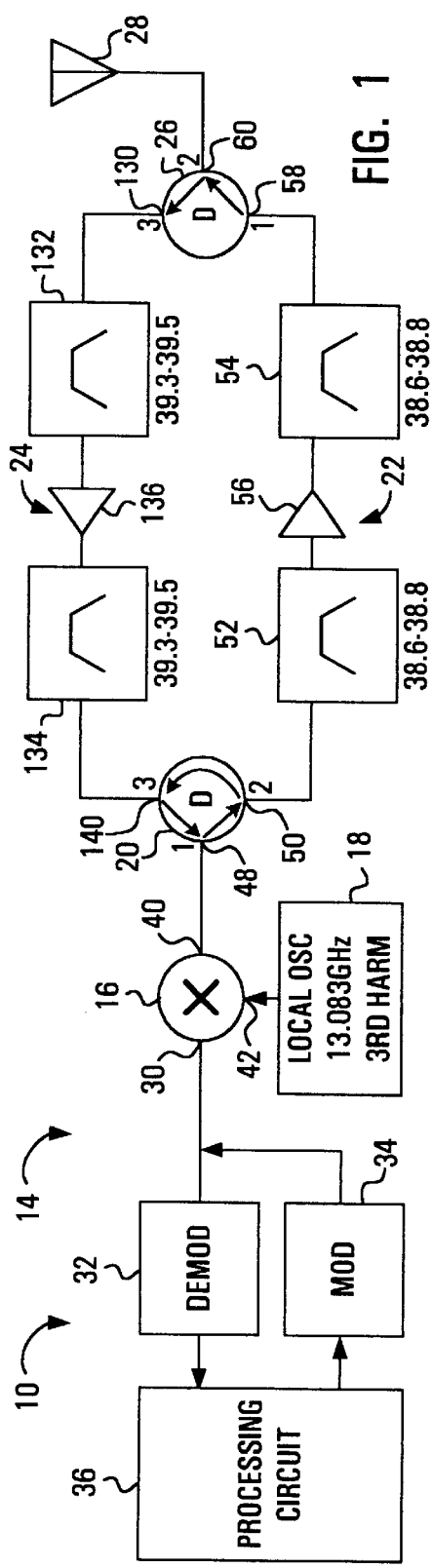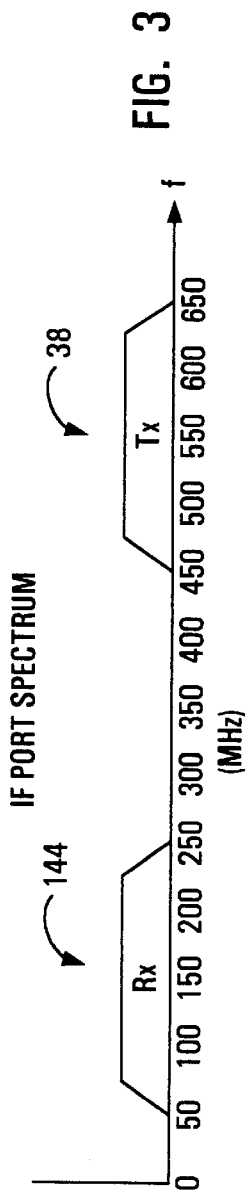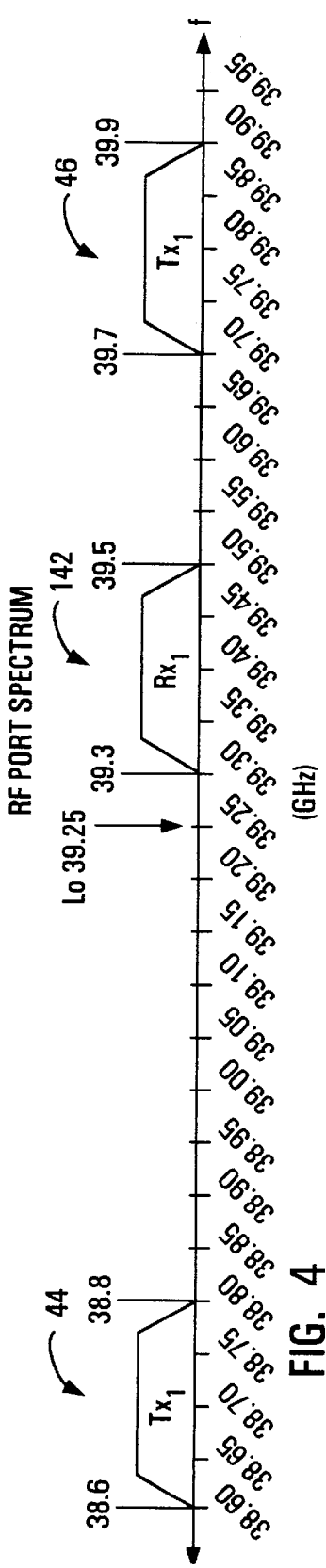

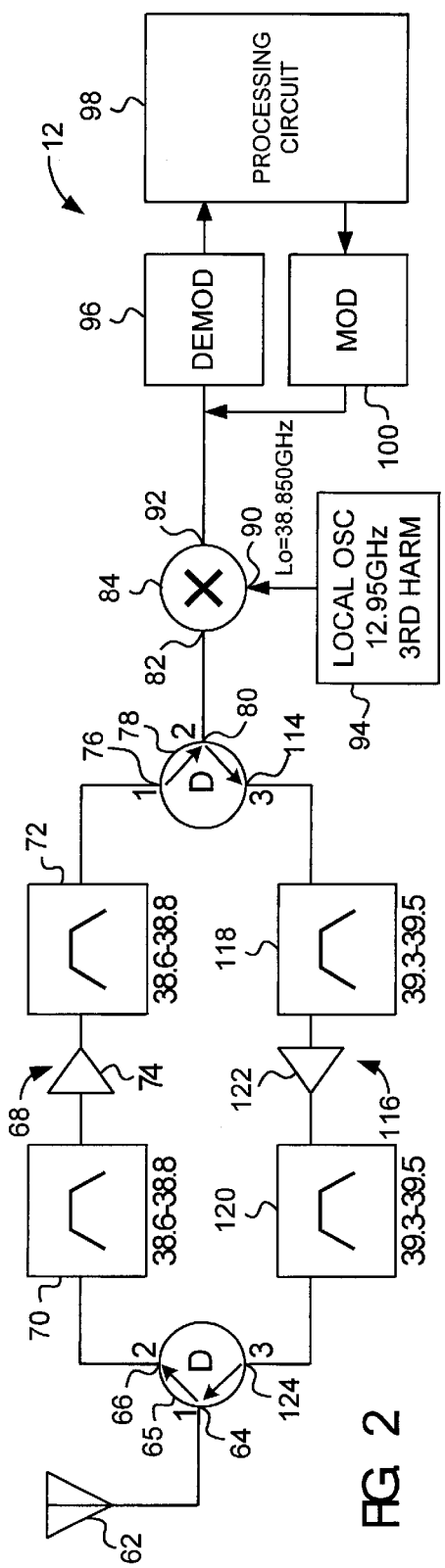
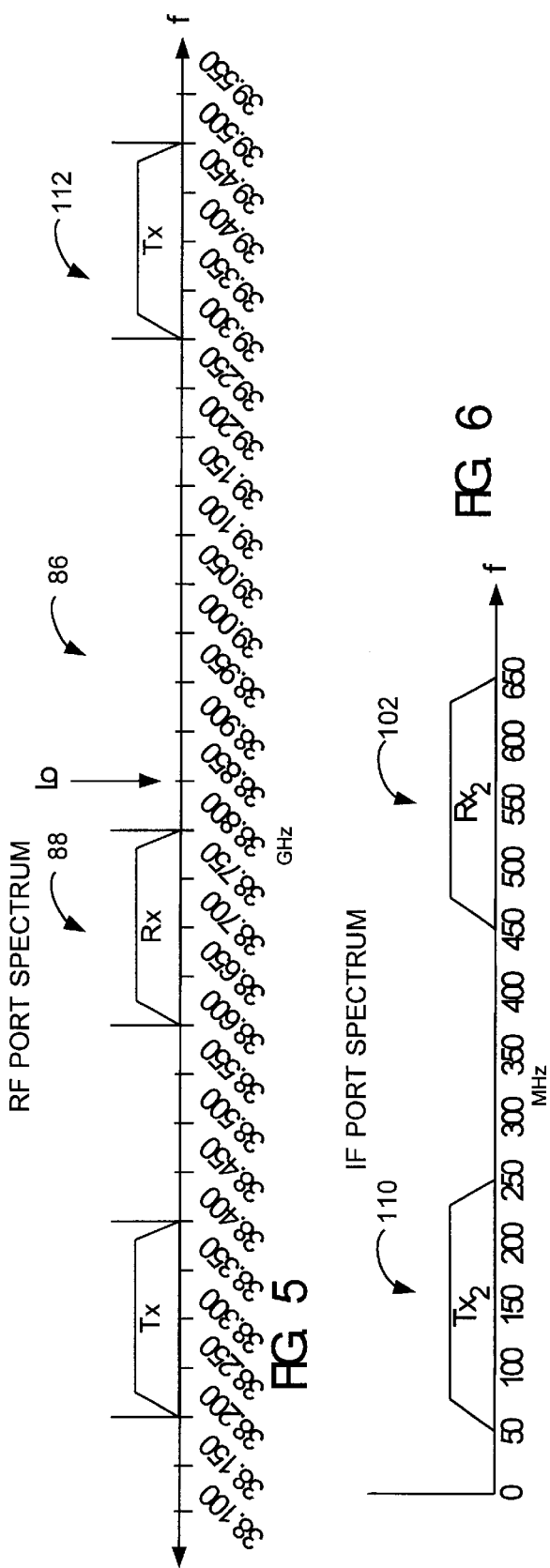

BIDIRECTIONAL FREQUENCY TRANSLATOR AND FULL DUPLEX TRANSCEIVER SYSTEM EMPLOYING SAME

BACKGROUND OF THE INVENTION

1. Field of the Invention

This invention relates to full duplex transceiver systems and more particularly to frequency translation in transceiver systems involving bidirectional frequency translation.

2. Background of the Invention

Many radios are of the type that employ separate circuit stages for multiplexing and frequency translation for separating receive signals from transmit signals and for translating low frequency signals into radio frequency or high frequency bands. The use of separate circuit stages for multiplexing and frequency translation introduces a distortion in the form of phase error and group delay and distortion due to unwanted coupling. Additionally the use of separate circuit stages imposes a cost associated with the components used to implement the stages, and also imposes enclosure size limitations, power supply requirements and power dissipation considerations. In addition, the number of energy leakage paths in the system is determined by the number and placement of components.

Also, in a transceiver, frequency separation between transmit and receive frequencies is used to isolate separate transmit and receive frequency spectra. This is often accomplished using separate transmit and receive signal paths having respective up/down frequency translation stages. This leads to a redundancy in frequency translation components as similar components are used for each path. A reduction in components can be achieved by switching one up/down frequency translation stage selectively in and out of the transmit and receive paths but this defeats full duplex operation, reducing the system to half duplex operation only.

Thus, it would be desirable to achieve simultaneous up/down frequency translation in a single stage and reduce the number of circuit stages or reduce the number of components used in achieving multiplexing and frequency translation.

SUMMARY OF THE INVENTION

Embodiments of the present invention address the above needs by providing a bidirectional frequency translator apparatus and method in which transmit and receive spectra are simultaneously produced at both a low frequency port and a high frequency port of a mixer.

In accordance with one aspect of the invention, there is provided a method of frequency translation including receiving a first transmit signal at a low frequency port of a first mixer, up-converting the first transmit signal with the mixer to produce an up-converted first transmit signal at a high frequency port of the mixer, receiving a receive signal at the high frequency port, down-converting the receive signal at the mixer to produce a down-converted receive signal at the low frequency port and injecting the receive signal at the high frequency port while extracting the up-converted first transmit signal from the high frequency port.

The method may further include bandpass filtering a difference component of the up-converted transmit signal to produce a filtered difference component of the transmit signal and coupling the filtered difference component to an antenna system for transmission of the filtered difference component of the filtered difference signal.

The method may further include receiving and filtering a raw received signal from an antenna system to produce the receive signal.

When the method is implemented in a first radio or transceiver the method includes driving the mixer with a local oscillator signal having a frequency between a frequency spectrum of a difference component of the up-converted transmit signal and a frequency spectrum of the receive signal and when the method is implemented in a second radio or transceiver in communication with the first radio or transceiver, the method includes driving the mixer with a local oscillator signal having a frequency between a frequency spectrum of a sum component of the up-converted transmit signal and a frequency spectrum of the receive signal.

In accordance with another aspect of the invention, there is provided a frequency translator apparatus including a mixer and a duplexer. The mixer has a low frequency port and a high frequency port and is operable to receive a first transmit signal at the low frequency port and up-convert the first transmit signal to produce an up-converted first transmit signal at the high frequency port, while receiving a receive signal at the high frequency port and down-converting the receive signal to produce a down-converted receive signal at the low frequency port. The duplexer functions to inject the receive signal at the high frequency port while extracting the up-converted first transmit signal from the high frequency port.

Preferably, the apparatus includes a bandpass filter for bandpass filtering a difference component of the up-converted transmit signal to produce a filtered difference component of the transmit signal and includes an antenna system and a coupler for coupling the filtered difference component to the antenna system for transmission of the filtered difference component of the filtered difference signal. The coupler may include a final duplexer.

The apparatus may include components for receiving a raw received signal from the final duplexer and for filtering the raw receive signal to produce the receive signal.

Preferably, the apparatus includes a local oscillator for driving the mixer to produce a local oscillator signal having a frequency between a frequency spectrum of a difference component of the up-converted transmit signal and a frequency spectrum of the receive signal.

Another embodiment of the invention may include a local oscillator for driving the first mixer to produce a local oscillator signal having a frequency between a frequency spectrum of a sum component of the up-converted transmit signal and a frequency spectrum of the first receive signal.

In accordance with another aspect of the invention, there is provided a communication system including a first radio having a frequency translator apparatus as described above.

The communication system may further include a second radio having a second frequency translator apparatus including a second mixer and a second duplexer. The second mixer has a second low frequency port and a second high frequency port, and is operable to receive a second transmit signal at the second low frequency port and up-convert the second transmit signal to produce an up-converted second transmit signal at the second high frequency port, while receiving a second receive signal at the second high frequency port and down-converting the second receive signal to produce a second down-converted receive signal at the second low frequency port. The second duplexer injects the second receive signal at the second high frequency port while extracting the up-converted second transmit signal from the second high frequency port.

The second frequency translator apparatus includes a second local oscillator for driving the second mixer to produce a second local oscillator signal having a second frequency between a frequency spectrum of a sum component of the up-converted transmit signal and a frequency spectrum of the second receive signal.

In each of the above aspects the duplexer may be replaced with a coupler, a hybrid tee, or a circulator.

Effectively, embodiments the invention employ a single low frequency path and common mixer and uses the sum or difference mixing components in full duplex operation without the requirement to superheterodyne the low frequency or to use two or more mixers.

The use of a single bidirectional frequency transition stage eliminates the need to combine and divide the transmit low frequency signal and receive low frequency signal. Thus, multiplexing is automatically performed simultaneously with frequency translation. This reduces phase errors, group delays and distortions.

This also leads to a reduction of the number of components which improves reliability, reduces costs and reduces power dissipation. The number of components is reduced because the single local oscillator drives only one port and therefore requires less drive capability than required of the local oscillators used to drive two separate mixers.

Furthermore, with only high frequency and low frequency paths, coupling between transmit and receive signals is reduced and more predictable. Effectively leakage paths are reduced.

BRIEF DESCRIPTION OF THE DRAWINGS

In drawings which illustrate embodiments of the invention,

FIG. 1 is a block diagram of a first radio according to a first embodiment of the invention;

FIG. 2 is a block diagram of a second radio according to a first embodiment of the invention;

FIG. 3 is a schematic representation of a first low frequency port signal spectrum of a composite signal appearing at a first low frequency port of the first radio shown at FIG. 1;

FIG. 4 is a schematic representation of a high frequency port signal spectrum of a composite high frequency signal appearing at a high frequency port of a mixer in the radio shown in FIG. 1;

FIG. 5 is a schematic representation of a high frequency port signal spectrum of a composite high frequency signal appearing at a high frequency port of a mixer in the second radio shown in FIG. 1;

FIG. 6 is a schematic representation of a second low frequency port signal spectrum of a composite signal appearing at a second low frequency port of the first radio shown at FIG. 1.

DETAILED DESCRIPTION

The present embodiment of the invention provides an apparatus and method for bidirectional frequency translation in a transceiver. Such transceiver may be part of a radio which itself is part of a radio system involving one or more radios. Each radio of the radio system may employ an apparatus and method according to the present embodiment of the invention.

Referring to FIGS. 1 and 2, first and second radios of a radio system are shown at 10 and 12 respectively.

The first radio includes a first transceiver shown generally at 14 including a first mixer 16, a first local oscillator 18 and a first duplexer 20. The first duplexer is further connected to a first transmit path shown generally at 22 and to a first receive path shown generally at 24. Both are connected to a first final duplexer 26 further connected to a first antenna 28.

The first mixer 16 has a first low frequency port 30, which is connected to a first demodulator 32 and a first modulator 34 which are both connected to a first processing circuit 36.

In this embodiment, the first processing circuit provides a serial bit stream of data to the first modulator 34 at a rate of 155 Mbps in response to which the first modulator produces a first low frequency transmit signal which is applied to the first low frequency port 30. Effectively, the first modulator 34 can be virtually any type of modulator capable of producing a first low frequency transmit signal having a spectral bandwidth of, in this embodiment, 200 MHz or less.

Referring to FIG. 3, the first low frequency transmit signal has a first low frequency transmit signal spectrum shown generally at 38 having a 200 MHz bandwidth centered on 550 MHz to extend between 450 and 650 MHz.

Referring to FIG. 1, the first low frequency transmit signal produced by the first modulator 34 is received at the first low frequency port 30 and is frequency translated or up-converted by the first mixer 16 to produce a first high frequency transmit signal, or up-converted first transmit signal at a first high frequency port 40 of the first mixer 16.

In this embodiment, the first local oscillator 18 produces a 13.083 GHz signal which is received at a first oscillator port 42 of the first mixer. The first mixer is a double balanced third harmonic mixer having a first output coupler designed to pass 39.25 GHz signals and attenuate 13.083 GHz signals. The first mixer has an input specification having a third order intercept IP3 of 10 dbm and a 1 db compression point of 2 dbm. In this embodiment the first mixer has a conversion loss of about 14 db. A first local oscillator signal having a frequency of 39.25 GHz is thus produced.

Referring to FIGS. 1, 3 and 4, the first low frequency transmit signal spectrum 38 is translated by the first mixer 16 into a first high frequency transmit signal having a first transmit signal spectrum shown generally at 44, which is below the oscillator frequency of 39.25 GHz. In this embodiment, with the frequencies presented thus far, the first transmit signal frequency spectrum is the result of mixing a difference component and is inverted and centered on 38.7 GHz and extends between 38.6 GHz and 38.8 GHz. A similar non-inverted sum component transmit signal spectrum also occurs as shown at 46 in FIG. 4 and is centered on 39.8 GHz, and extends between 39.7 GHz and 39.9 GHz.

The first high frequency transmit signal is communicated to a first port 48 of the first duplexer 20. The first duplexer 20 transfers the signal to a second port 50 which is connected to the first transmit path 22. Alternatively, the first duplexer may be replaced with a coupler, hybrid tee, or circulator or any other device which provides high directivity between ports used for transmit and receive signals.

The first transmit path includes a first pair of transmit bandpass filters 52 and 54 and a first high gain transmit amplifier 56 interposed therebetween. The first pair of transmit bandpass filters 52 and 54 pass frequencies in the frequency range between 38.6 GHz and 38.8 GHz such that a difference component of the up-converted first high frequency transmit signal is passed relatively unattenuated, through the first transmit path 22, while attenuating the sum component of the up-converted first high frequency transmit signal.

The high gain transmit amplifier 56 acts to increase the level of the first filtered high frequency transmit signal to drive the first antenna 28, through the first final duplexer 26. The first final duplexer 26 has a first port 58 for receiving the first high frequency transmit signal from the first transmit path 22 and communicates such signal to a second port 60 of the first final duplexer which is connected to the first antenna 28. Thus, the filtered difference component is coupled to an antenna system for transmission of the filtered difference component of the first high frequency transmit signal. The first antenna 28 may form part of a microwave link, for example. Alternatively, the first antenna may be replaced with an antenna system employing separate transmit and receive antennas, or an interface to any other type of communications link.

Referring to FIG. 2, the signal transmitted from the first radio (10) is received at a second antenna 62 of the second radio 12 operating as part of the microwave link. The signal so received is provided to a first port 64 of a second final duplexer 65 of the second radio 12 which forwards such signal to a second port 66 thereof. The signal appearing at the second port 66 is passed to a second receive path 68 including a second pair of receive bandpass filters 70 and 72 and a second low noise amplifier 74 interposed therebetween. The second pair of receive bandpass filters 70 and 72 pass signals having frequencies between 38.6 GHz and 38.8 GHz while the second low noise amplifier 74 increases the amplitude of such signals.

The second receive path 68 is connected to a first port 76 of a second duplexer 78 which forwards the second receive signal received at the first port 76 to a second port 80 of the second duplexer. The second port is connected to a second high frequency port 82 of a second mixer 84.

Referring to FIG. 5, the signal appearing at the second high frequency port 82 of the second mixer 84 is shown generally at 86 and includes the second high frequency receive signal having a spectrum 88 centered on 38.7 GHz and extending between 38.6 GHz and 38.8 GHz.

The second mixer 84 further has a second local oscillator input 90 and a second low frequency port 92.

The second local oscillator input 90 is connected to a second local oscillator 94 which produces a second oscillator signal having a frequency of 12.95 GHz. The second mixer 84 is also a double balanced third harmonic mixer but has an output coupler designed to pass frequencies of approximately 38.850 GHz while attenuating signals having frequencies at or about 12.95 GHz and thus produces a second oscillator signal having a frequency of 38.850 GHz.

The second mixer 84 acts as a frequency translator to translate the second high frequency received signal appearing at the second high frequency port 82 to a low frequency range. Referring to FIGS. 2 and 6, the second mixer 84 thus produces a second low frequency signal having a signal spectrum centered on 550 MHz and extending between 450 MHz and 650 MHz. This signal is passed to a second demodulator 96 which demodulates the second low frequency signal into a serial bit stream having a bit rate of 155 Mbps which is supplied to a second processing circuit 98. In this embodiment the second processing circuit may be any processing or communications circuit capable of receiving a serial bit stream at the rate indicated.

Similarly, the second processing circuit 98 may produce a 155 Mbps bit stream and such bit stream is provided to a second modulator 100 which produces a low frequency signal centered at 150 MHz and extending between 50 and 250 MHz as shown generally at 110 in FIG. 6. Referring to FIGS. 2 and 6, thus, the composite signal appearing at the second low frequency port 92 has a first receive component 102 centered at 550 MHz and extending between 450 and 650 MHz and has a second transmit component 110 centered at 150 MHz and extending between 50 and 250 MHz. Both signals are superposed at the second low frequency port 92.

The second mixer 84 also serves to translate the second low frequency transmit signal into a second high frequency transmit signal which is provided at the second high frequency port 82. Referring to FIG. 5, this second high frequency transmit signal is shown generally at 112 centered at 39.400 GHz and extending between 39.300 and 39.500 GHz, which is above the local oscillator signal frequency of 38.850.

This second high frequency transmit signal is transferred from the second port 80 of the second duplexer 78, to a third port 114 thereof whereupon it is transferred to a second transmit path 116.

The second transmit path 116 includes a second pair of transmit path filters 118 and 120 each being a bandpass filter having a bandpass range of 39.3 GHz to 39.5 GHz. A transmit amplifier 122 is disposed between the transmit path filters 118 and 120 to increase the signal levels to drive the second antenna 62. The signal from the second transmit path 116 is provided to a third port 124 of the second final duplexer 65 which forwards the signal to the first port 64, thereby coupling the signal to the second antenna 62 for transmission to the first radio shown in FIG. 1.

Referring to FIG. 1, the second transmitted signal is received at the first antenna 28 as a first raw received signal and is forwarded from the second port 60 to a third port 130 of the first final duplexer 26. The third port 130 is connected to the first receive path 24 which includes first and second receive path bandpass filters 132 and 134 with a low noise amplifier 136 interposed therebetween. Each of the receive path bandpass filters 132 and 134 has a bandpass frequency range of 39.3 GHz to 39.5 GHz. Thus the first raw received signal is received and filtered to produce a first receive signal.

The first receive path 24 provides the first receive signal to a third port 140 of the first duplexer 20 which forwards the signal to the first port 48, thereby producing a receive signal spectrum at the first high frequency port 40 of the first mixer. In other words, the first receive signal is received at the first high frequency port. Effectively, the first receive signal is injected at the high frequency port while the up-converted first transmit signal is extracted from the first high frequency port.

Referring to FIG. 4, the receive path signal spectrum is shown generally at 142 centered on 39.40 GHz and extending between 39.3 GHz and 39.5 GHz. The first receive signal is down-converted by the first mixer 16 to produce a down-converted receive signal at the low frequency port. This down-converted receive signal has a 200 MHz spectrum centered on 150 MHz and extending between 50 and 250 MHz as shown at 144 in FIG. 3.

The first demodulator 32 is sensitive to the first receive signal spectrum 144 and demodulates the first receive signal into a 155 Mbps bit stream which is supplied to the first processing circuit 36.

The present embodiment of the invention provides a frequency translator that will block up and down convert a frequency multiplexed high frequency signal to a non-inverted receive low frequency signal using a single mixer. In two radios, a port to port communications link together with the radios use both the sum and difference mixing components in full duplex operation without the requirement to superheterodyne or use two or more mixers.

Advantage is taken of the use of a local oscillator having a frequency between the transmit and receive radio frequencies and an antenna duplexer or directional coupler is used unconventionally as a high frequency input-output port for a mixer. Effectively, a single mixer is used for the simultaneous block up and down frequency translation in a single step. With only one bidirectional mixer there is no requirement for multiple local oscillators or a divided single oscillator. Using a local oscillator frequency between the transmit and receive radio frequencies, a non-inverted low frequency signal is produced, even with the transmit high frequency signal inverted in one of the transceivers.

Effectively the present embodiment of the invention provides for a single input to the mixer for up and down frequency translation and allows channel selection of the frequency division multiplex signal to be done by selecting the desired low frequency.

It will be appreciated that the frequencies used in the above example are exemplary only and that other frequencies may be employed to achieve similar results.

While specific embodiments of the invention have been described and illustrated, such embodiments should be considered illustrative of the invention only and not as limiting the invention as construed in accordance with the accompanying claims.

What is claimed is:

1. A method of frequency translation including:
    a) receiving a transmit signal at a low frequency port of a mixer and up-converting said transmit signal with said mixer to produce an up-converted transmit signal at a high frequency port of said mixer; while
    b) receiving a receive signal at said high frequency port and down-converting said receive signal at said mixer to produce a down-converted receive signal at said low frequency port; and
    c) injecting said receive signal at said high frequency port while extracting said up-converted transmit signal from said high frequency port.

2. A method as claimed in claim 1 further including bandpass filtering a difference component of said up-converted transmit signal to produce a filtered difference component of said transmit signal.

3. A method as claimed in claim 2 further including coupling said filtered difference component to an antenna system for transmission of said filtered difference component.

4. A method as claimed in claim 1 further including receiving and filtering a raw received signal from an antenna system to produce said receive signal.

5. A method as claimed in claim 1 further including driving said mixer with a local oscillator signal having a frequency between a frequency spectrum of a difference component of said up-converted transmit signal and a frequency spectrum of said receive signal.

6. A method as claimed in claim 1 further including driving said mixer with a local oscillator signal having a frequency between a frequency spectrum of a sum component of said up-converted transmit signal and a frequency spectrum of said receive signal.

7. A frequency translator apparatus including:
    a) a mixer having a low frequency port and a high frequency port, and being operable to:
        i) receive a transmit signal at said low frequency port and up-convert said transmit signal to produce an up-converted transmit signal at said high frequency port, while
        ii) receiving a receive signal at said high frequency port and down-converting said receive signal to produce a down-converted receive signal at said low frequency port;
    b) a duplexer for injecting said receive signal at said high frequency port while extracting said up-converted transmit signal from said high frequency port.

8. An apparatus as claimed in claim 7 further including a bandpass filter for bandpass filtering a difference component of said up-converted transmit signal to produce a filtered difference component of said transmit signal.

9. An apparatus as claimed in claim 8 further including an antenna system and a coupler for coupling said filtered difference component to said antenna system for transmission of said filtered difference component.

10. An apparatus as claimed in claim 9 wherein said coupler includes a final duplexer.

11. An apparatus as claimed in claim 10 further including a receiver for receiving a raw received signal from said final duplexer and a filter for filtering said raw receive signal to produce said receive signal.

12. An apparatus as claimed in claim 7 further including a local oscillator for driving said mixer to produce a local oscillator signal having a frequency between a frequency spectrum of a difference component of said up-converted transmit signal and a frequency spectrum of said receive signal.

13. An apparatus as claimed in claim 7 further including a local oscillator for driving said mixer to produce a local oscillator signal having a frequency between a frequency spectrum of a sum component of said up-converted transmit signal and a frequency spectrum of said receive signal.

14. A communication system comprising:
    a) a first radio having a first frequency translator apparatus including:
        i) a first mixer having a first low frequency port and a first high frequency port, and being operable to:
            receive a first transmit signal at said first low frequency port and up-convert said first transmit signal to produce an up-converted first transmit signal at said first high frequency port, while
            receiving a first receive signal at said first high frequency port and down-converting said first receive signal to produce a down-converted first receive signal at said first low frequency port; and
        ii) a first duplexer for injecting said first receive signal at said first high frequency port while extracting said up-converted first transmit signal from said first high frequency port.

15. A system as claimed in claim 14 further including a first bandpass filter for bandpass filtering a first difference component of said up-converted first transmit signal to produce a first filtered difference component of said first transmit signal.

16. A system as claimed in claim 15 further including a first antenna system and a first coupler for coupling said first filtered difference component to said first antenna system for transmission of said first filtered difference component.

17. A system as claimed in claim 16 wherein said first coupler includes a first final duplexer.

18. A system as claimed in claim 17 further including a receiver for receiving a first raw received signal from said first final duplexer and a filter for filtering said first raw receive signal to produce said first receive signal.

19. A system as claimed in claim 14 further including a first local oscillator for driving said first mixer to produce a first local oscillator signal having a first frequency between a frequency spectrum of a first difference component of said up-converted first transmit signal and a frequency spectrum of said first receive signal.

20. A system as claimed in claim 19 further including:
  a second radio having a second frequency translator apparatus including:
   i) a second mixer having a second low frequency port and a second high frequency port, and being operable to:
     receive a second transmit signal at said second low frequency port and up-convert said second transmit signal to produce an up-converted second transmit signal at said second high frequency port, while
     receiving a second receive signal at said second high frequency port and down-converting said second receive signal to produce a second down-converted receive signal at said second low frequency port; and
   ii) a second duplexer for injecting said second receive signal at second said high frequency port while extracting said up-converted second transmit signal from said second high frequency port.

21. A system as claimed in claim 20 further including a second local oscillator for driving said second mixer to produce a second local oscillator signal having a second frequency between a frequency spectrum of a sum component of said up-converted second transmit signal and a frequency spectrum of said second receive signal.

22. A frequency translator apparatus including:
  a) a mixer having a low frequency port and a high frequency port, and being operable to:
   i) receive a transmit signal at said low frequency port and up-convert said transmit signal to produce an up-converted transmit signal at said high frequency port, while
   ii) receiving a receive signal at said high frequency port and down-converting said receive signal to produce a down-converted receive signal at said low frequency port; and
  b) means for injecting said receive signal at said high frequency port while extracting said up-converted transmit signal from said high frequency port.

* * * * *